(12) United States Patent
Agawa

(10) Patent No.: US 8,714,954 B2
(45) Date of Patent: May 6, 2014

(54) TIRE VULCANIZER

(75) Inventor: Jiro Agawa, Tokyo (JP)

(73) Assignee: Mitsubishi Heavy Industries Machinery Technology Corporation, Hiroshima-shi (JP)

( * ) Notice: Subject to any disclaimer, the term of this patent is extended or adjusted under 35 U.S.C. 154(b) by 0 days.

(21) Appl. No.: 13/988,943

(22) PCT Filed: Jan. 12, 2012

(86) PCT No.: PCT/JP2012/050469
§ 371 (c)(1),
(2), (4) Date: May 22, 2013

(87) PCT Pub. No.: WO2012/176482
PCT Pub. Date: Dec. 27, 2012

(65) Prior Publication Data
US 2013/0251832 A1  Sep. 26, 2013

(30) Foreign Application Priority Data
Jun. 23, 2011  (JP) .................................. 2011-139960

(51) Int. Cl.
*B29C 33/22* (2006.01)
(52) U.S. Cl.
USPC .......................... 425/47; 425/34.1; 425/451.9
(58) Field of Classification Search
USPC ................................. 425/34.1, 47, 195, 451.9
See application file for complete search history.

(56) References Cited

U.S. PATENT DOCUMENTS

| 4,245,971 A | * | 1/1981 | MacMillan | 425/47 |
| 4,453,902 A | * | 6/1984 | Imbert | 425/47 |
| 6,506,044 B1 | * | 1/2003 | Francesco | 425/451.9 |

FOREIGN PATENT DOCUMENTS

| JP | 1985-14913 U | 1/1985 |
| JP | S62-222809 A | 9/1987 |
| JP | 2002-205307 A | 7/2002 |
| JP | 2008-221554 A | 9/2008 |

OTHER PUBLICATIONS

PCT, "International Search Report for PCT/JP2012/050469", Mar. 13, 2012.

* cited by examiner

*Primary Examiner* — James Mackey
(74) *Attorney, Agent, or Firm* — Manabu Kanesaka; Kenneth M. Berner; Benjamin J. Hauptman

(57) ABSTRACT

Provided is a tire vulcanizer capable of adjusting the height of an upper mold attaching member or a lower mold attaching member while fixing the position of the upper mold attaching member or the lower mold attaching member, with a simple structure. A tire vulcanizer (2) includes: a guide frame (5) that supports an upper mold attaching member (21) and a base frame (26); a fixed rack (6) that is provided to the guide frame (5) along the height direction of a mold (23) and includes a plurality of teeth, the mold (23) including an upper mold (4) placed in the upper mold attaching member (21) and a lower mold (35) placed in the base frame (26); a movable rack (7) that is provided to the upper mold attaching member (21), meshes with the fixed rack (6), and includes a plurality of teeth; and an air cylinder that moves the movable rack (7) in the height direction of the mold (23) with respect to the upper mold attaching member (21) while keeping the height of the upper mold attaching member (21) constant.

4 Claims, 16 Drawing Sheets

US 8,714,954 B2

TIRE VULCANIZER

RELATED APPLICATIONS

The present application is National Phase of International Application No. PCT/JP2012/050469 filed Jan. 12, 2012, and claims priority from, Japanese Application No. 2011-139960, filed Jun. 23, 2011.

TECHNICAL FIELD

The present invention relates to a tire vulcanizer that vulcanizes an unvulcanized tire in a mold.

BACKGROUND ART

A tire vulcanizer is an apparatus that vulcanizes an unvulcanized tire in a mold to make a vulcanized tire. The mold is fixed to a guide frame, a column, or the like so as not to be opened by pressurization reaction force during the vulcanization process.

PTL 1 discloses an invention that relates to an independently activated right/left column type vulcanizer, and discloses a technique of achieving the compactification of the entire vulcanizer in consideration of the arrangement of: a loader that carries a raw tire into a mold opening/closing apparatus of the vulcanizer; and an unloader that carries a vulcanized tire out of the mold opening/closing apparatus.

CITATION LIST

Patent Literature

{PTL 1}
Japanese Unexamined Patent Application, Publication No. 2008-221554

SUMMARY OF INVENTION

Technical Problem

In a conventional vulcanizer, a holding mechanism that holds a mold against pressurization reaction force includes a mold height adjusting apparatus, a clamped member, and a clamping apparatus. Then, when the mold height adjusting apparatus is fixed and the clamping apparatus is fixed to the clamped member, the mold is held in a vulcanization process. In PTL 1, upward/downward movement screws 14a and 14b correspond to the mold height adjusting apparatus, columns 18a and 18b correspond to the clamped member, and locking apparatuses 21a and 21b correspond to the clamping apparatus.

For the holding mechanism that holds the mold in the conventional vulcanizer as disclosed in PTL 1, the mold height adjusting apparatus, the clamped member, and the clamping apparatus thereof are configured independently of one another, the number of components is large, and the structure thereof is complicated.

Further, a screw member having a cylindrical surface on which trapezoidally threaded teeth are formed is used for the mold height adjusting apparatus. Unfortunately, such a member requires precision control for machining and assembling as well as maintenance such as lubrication for performance keeping.

The present invention, which has been made in view of the above-mentioned circumstances, has an object to provide a tire vulcanizer capable of adjusting the height of an upper mold attaching member or a lower mold attaching member while fixing the position of the upper mold attaching member or the lower mold attaching member, with a simple structure.

Solution to Problem

In order to solve the above-mentioned problems, a tire vulcanizer of the present invention adopts the following solutions.

That is, a tire vulcanizer according to the present invention includes: a support member that supports an upper mold attaching member and a lower mold attaching member; a first rack that is provided to the support member along a height direction of a mold and includes a plurality of teeth, the mold including an upper mold placed in the upper mold attaching member and a lower mold placed in the lower mold attaching member; a second rack that is provided to the upper mold attaching member or the lower mold attaching member, meshes with the first rack, and includes a plurality of teeth; a first driving unit that relatively moves one of the first rack and the second rack with respect to the other thereof, meshes the first rack and the second rack with each other to fix the two racks to each other, and cancels the mesh between the first rack and the second rack; and a second driving unit that moves the second rack in the height direction of the mold with respect to the upper mold attaching member or the lower mold attaching member while keeping a height of the upper mold attaching member or the lower mold attaching member constant.

According to this invention, when the first rack and the second rack mesh with each other to be fixed to each other, the upper mold attaching member or the lower mold attaching member (hereinafter, referred to as "mold attaching member") to which the second rack is provided is fixed to the support member to which the first rack is provided. Meanwhile, when the mesh between the first rack and the second rack is cancelled, the fixation between the mold attaching member and the support member is cancelled, the mold attaching member becomes movable in, for example, the height direction of the mold. Further, because the plurality of teeth of each of the first rack and the second rack are arranged in the height direction of the mold, the height of the mold attaching member can be adjusted, and the mold attaching member can be fixed to the support member, within a range within which the first rack and the second rack can mesh with each other.

Then, the height of the second rack is changeable with respect to the mold attaching member. Hence, when the second rack moves in the direction in which the first rack and the second rack mesh with each other, in the case where the teeth of the two racks interfere with each other and where the two racks cannot completely mesh with each other, the height of the second rack is adjusted, whereby the first rack and the second rack can be caused to completely mesh with each other. At this time, the second rack can be moved while the height of the mold attaching member is kept constant, and hence the height of the mold attaching member is not changed by an influence of mesh adjustment.

In the above-mentioned invention, when the first rack and the second rack mesh with each other, the first driving unit and the second driving unit may not be driven, and force may be transmitted to between the support member and the upper mold attaching member or the lower mold attaching member to which the second rack is provided, with an intermediation of the first rack and the second rack.

According to this invention, the first driving unit and the second driving unit are used only to move the first rack or the second rack. In the case where the first rack and the second rack mesh with each other, pressurization reaction force applied to the mold is held by the first rack and the second rack without the aid of the first driving unit and the second driving unit, and the pressurization reaction force is transmitted to between the support member and the upper mold attaching member or the lower mold attaching member to which the second rack is provided, with the intermediation of the first rack and the second rack.

In the above-mentioned invention, the tire vulcanizer may further include a link mechanism that couples the first driving unit to the first rack or the second rack that is relatively moved by the first driving unit.

According to this invention, the link mechanism transmits driving force of the first driving unit movable rack 7 to the first rack or the second rack, whereby the first rack or the second rack is relatively moved. Consequently, the first rack or the second rack can be moved with a compact and simple structure.

In the above-mentioned invention, the teeth of the first rack and the teeth of the second rack may have surfaces oblique to the height direction of the mold, the oblique surfaces of the teeth of the first rack and the oblique surfaces of the teeth of the second rack may be provided so as to be opposed to each other, and, when the teeth of the first rack and the teeth of the second rack come into contact with each other, the first rack and the second rack may be relatively movable along the mutual oblique surfaces.

According to this invention, even in the case where the teeth of the first rack and the teeth of the second rack come into contact with each other while the two racks move in the direction in which the two racks mesh with each other, the first rack and the second rack relatively move along the mutual oblique surfaces formed on the teeth thereof. Consequently, the height of the second rack is changed, whereby the first rack and the second rack completely mesh with each other.

Advantageous Effects of Invention

According to the present invention, it is possible to adjust the height of an upper mold attaching member or a lower mold attaching member while fixing the position of the upper mold attaching member or the lower mold attaching member, with a simple structure.

DESCRIPTION OF EMBODIMENTS

Figure 1:
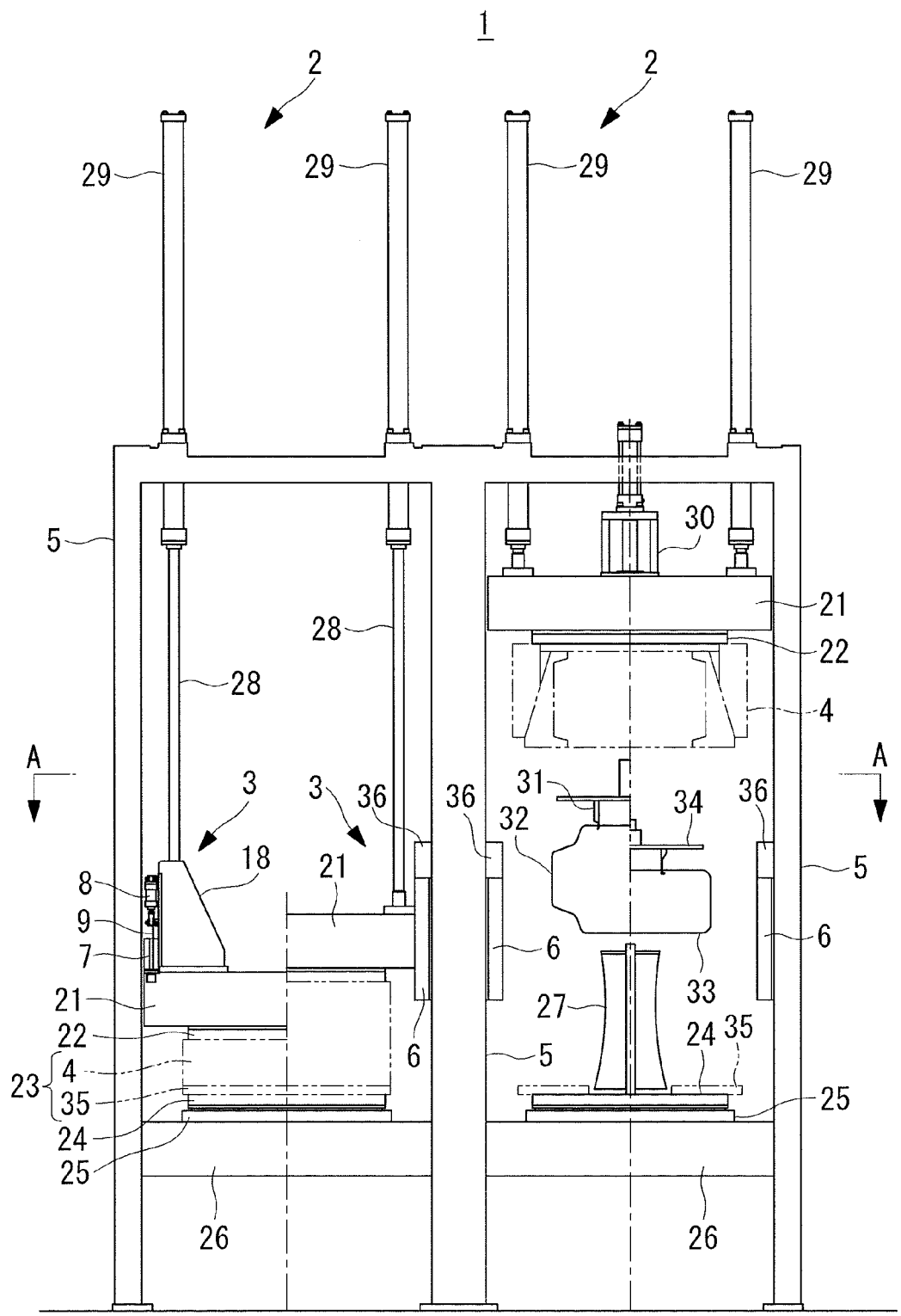
FIG. 1 is a front view illustrating a vulcanizing apparatus according to a first embodiment of the present invention.

Hereinafter, embodiments of the present invention are described with reference to the drawings.

A first embodiment of the present invention is described below with reference to FIG. 1.

A tire vulcanizing apparatus 1 includes a plurality of tire vulcanizers 2, and each tire vulcanizer 2 vulcanizes an unvulcanized tire 32 in a mold 23 to make a vulcanized tire 33. As illustrated in the right tire vulcanizer 2 in FIG. 1, the unvulcanized tire 32 is carried into the tire vulcanizer 2 by a loader 31, and the vulcanized tire 33 is carried out of the tire vulcanizer 2 by an unloader 34.

The size of the mold 23 of the tire vulcanizer 2 is changed in accordance with the size of a tire to be manufactured. The mold 23 includes an upper mold 4 and a lower mold 35. The upper mold 4 is attached to the lower side of an upper mold attaching member 21 with the intermediation of an upper platen 22, and moves up and down so as to follow the upward/downward movement of the upper mold attaching member 21. The upper mold attaching member 21 is moved up and down by driving of a hydraulic cylinder for upward/downward movement 29 provided in an upper portion of a guide frame 5. The upper mold attaching member 21 is provided at the lower end of a hydraulic cylinder rod 28 that enters and exits the hydraulic cylinder for upward/downward movement 29. The upper mold 4 can be opened and closed by driving of an openable/closable mold operating apparatus 30.

The lower mold 35 is attached and fixed to the upper surface of a pressurization cylinder 25 provided on a base frame 26, with the intermediation of a lower platen 24. The base frame 26 is supported by the gate-shaped guide frame 5. The guide frame 5 is fixed to an installation surface of the tire vulcanizing apparatus 1, supports the upper mold attaching member 21 by means of a pressurization holding unit 3, and supports the lower mold 35 by means of the base frame 26. The base frame 26 is an example of a lower mold attaching member.

A bladder 27 is arranged on the upper surface of the lower mold 35, and is made of a thin-film elastic body. In a vulcanization process, for example, high-temperature high-pressure steam is introduced into the bladder 27, and the high-temperature high-pressure steam pressurizes and heats the unvulcanized tire 32 from the inside thereof through the bladder 27, and pushes the unvulcanized tire 32 against the mold 23.

As illustrated in the right tire vulcanizer 2 in FIG. 1, when the upper mold 4 is positioned on the upper side, the unvulcanized tire 32 is carried in, and the vulcanized tire 33 is carried out. Meanwhile, as illustrated in the left tire vulcanizer 2 in FIG. 1, when the upper mold 4 is positioned on the lower side, the unvulcanized tire 32 is vulcanized in the mold 23. During the vulcanization process, because a pressure is applied to the inside of the mold 23, the pressurization cylinder 25 tightens up the mold 23 such that the mold 23 is not opened. Then, the mold 23 is fixed and held by the pressurization holding unit 3. That is, each fixed rack 6 and each movable rack 7 receive pressurization reaction force, and the upper mold attaching member 21 tightens up the mold 23. As a result, a pressure is generated in the pressurization cylinder 25, so that the mold 23 is tightened up.

The left half of the left tire vulcanizer 2 in FIG. 1 illustrates the case where the height of the mold 23 is small and where the width of a tire to be manufactured is small. The right half thereof illustrates the case where the height of the mold 23 is large and where the width of a tire to be manufactured is large. The height of the upper mold attaching member 21 when the mold 23 is fixed can be adjusted by the pressurization holding unit 3.

Next, the pressurization holding unit 3 is described with reference to FIG. 1 to FIG. 9.

The pressurization holding unit 3 can adjust the height of the upper mold attaching member 21 that is set in the vulcanization process, while fixing and holding the upper mold attaching member 21. The pressurization holding unit 3 includes: the fixed rack 6 placed in the guide frame 5; the movable rack 7 placed in the upper mold attaching member 21 side; an air cylinder 8 fixed to a guide bracket 17 above the upper mold attaching member 21; a height adjusting member 14; and an air cylinder 15.

Figure 6:
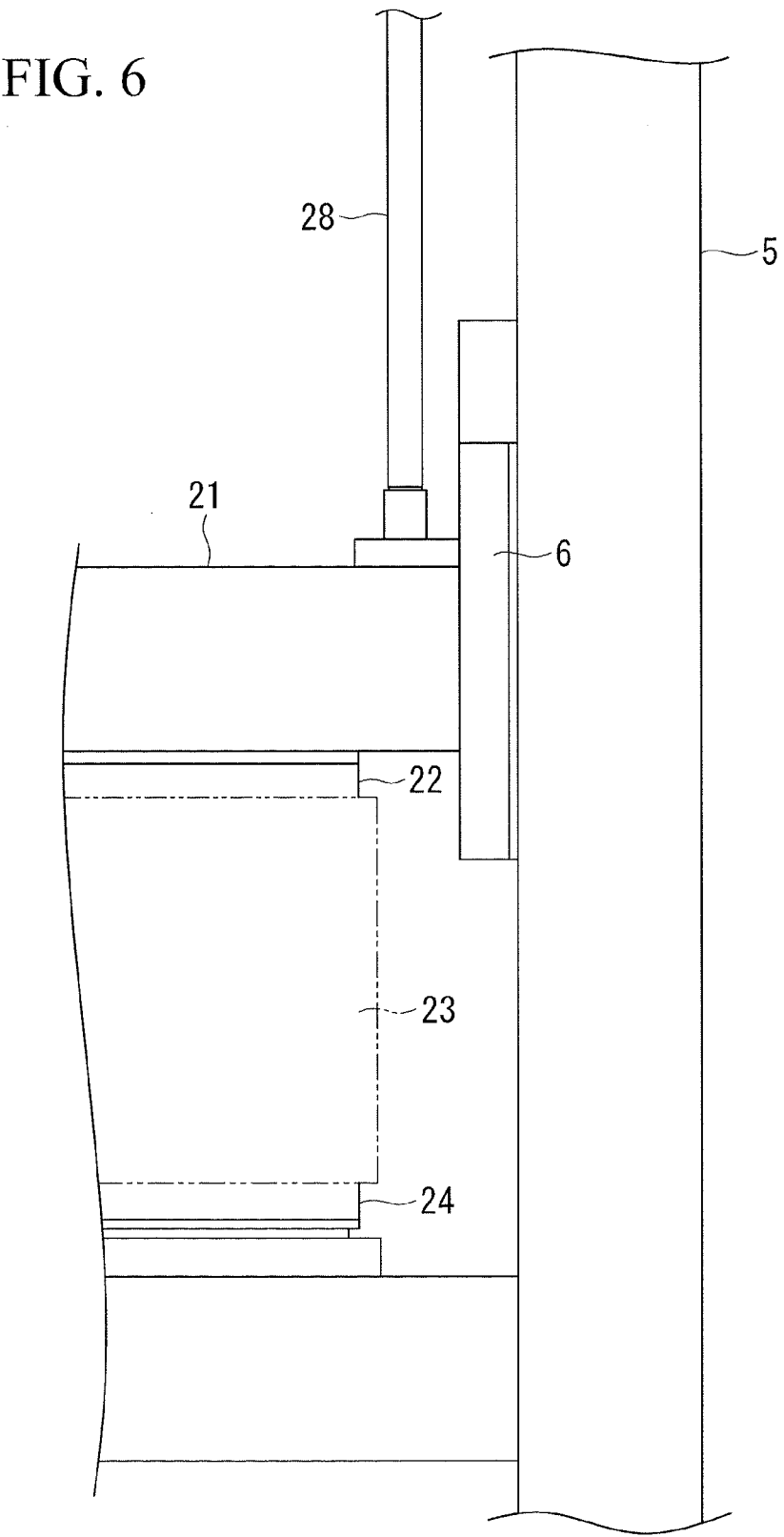
FIG. 6 is a side view illustrating the pressurization holding unit of the vulcanizing apparatus according to the first embodiment.

The fixed rack 6 is an example of a first rack, and has a plurality of teeth arranged in one direction. As illustrated in FIG. 1 and FIG. 6, the fixed rack 6 is provided inside of the guide frame 5, and is placed such that the plurality of teeth thereof are arranged along the height direction of the mold 23.

Figure 2:
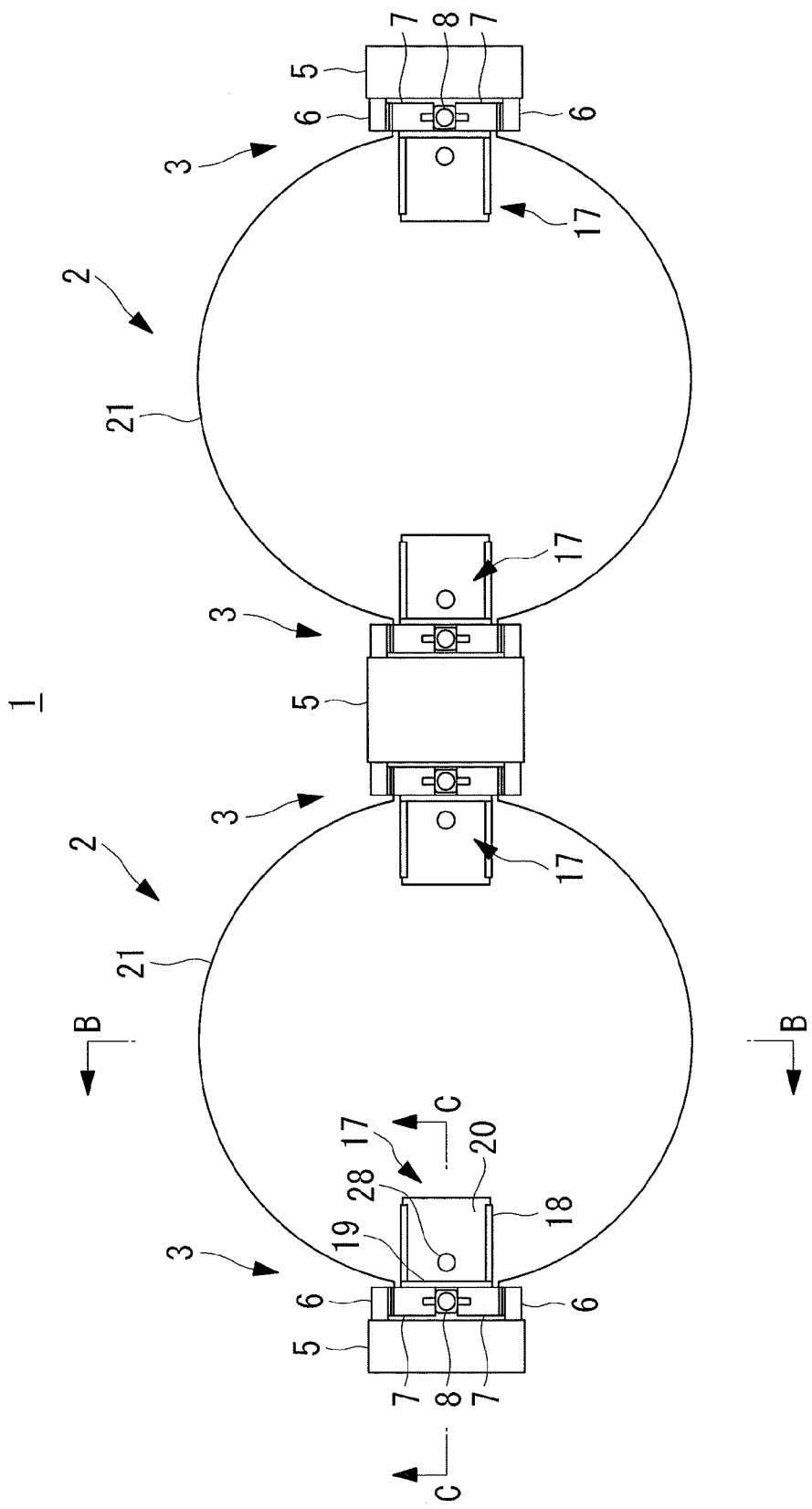
FIG. 2 is a cross sectional view taken along a line A-A in FIG. 1.
Figure 3:
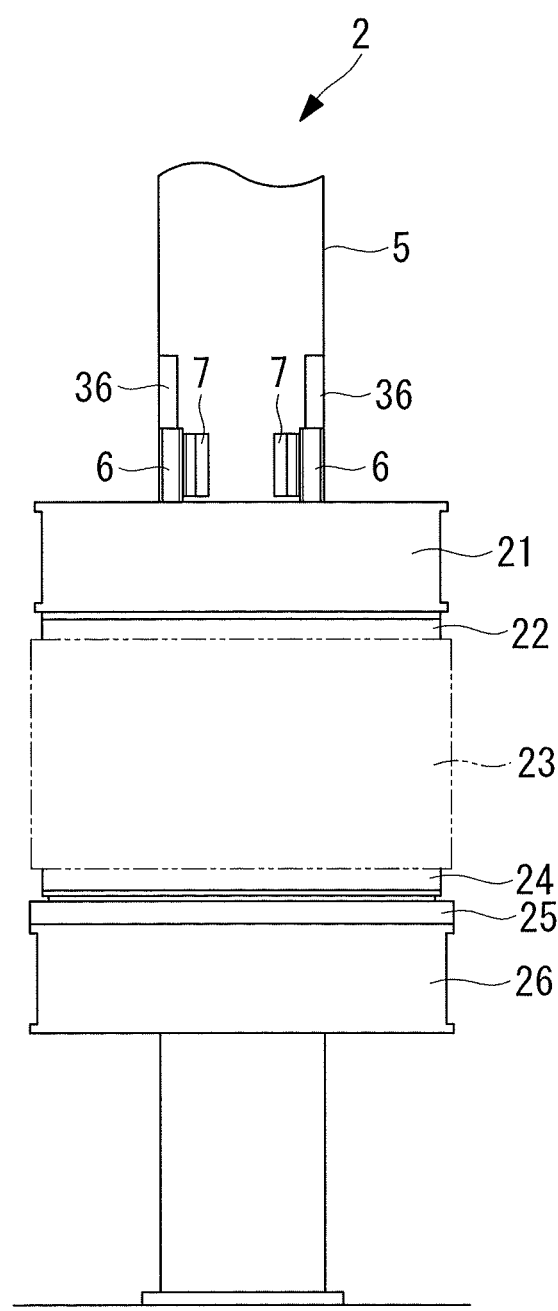
FIG. 3 is a cross sectional view taken along a line B-B in FIG. 2.
Figure 4:
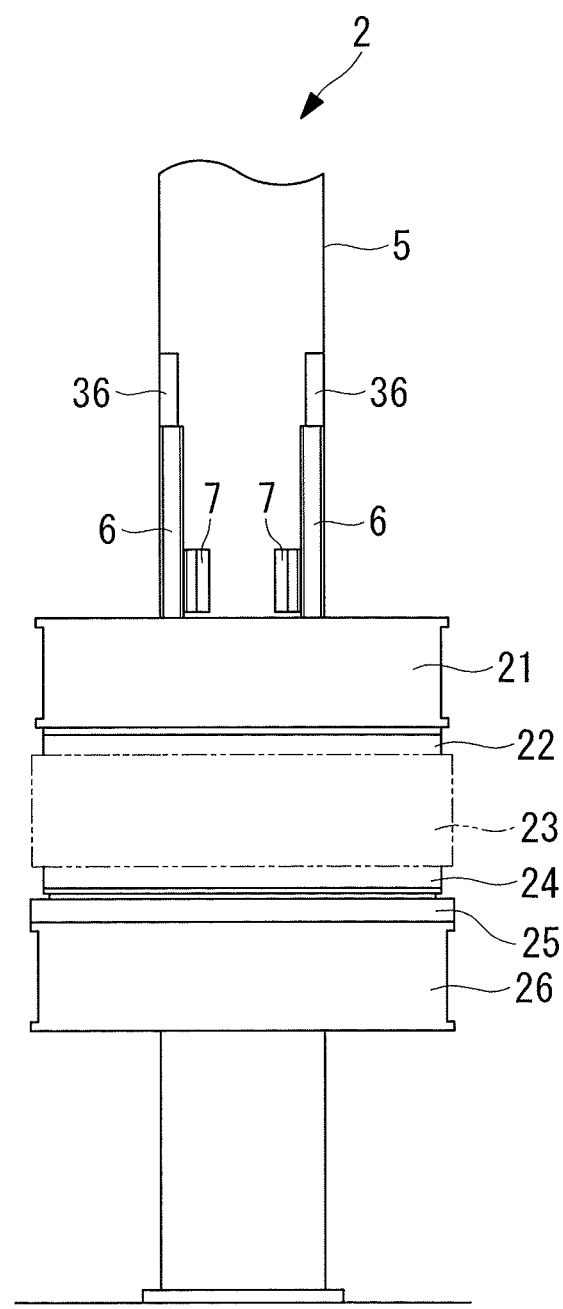
FIG. 4 is a cross sectional view taken along the line B-B in FIG. 2.

The movable rack 7 is an example of a second rack, and has a plurality of teeth arranged in one direction. As illustrated in FIG. 2 to FIG. 4, the movable rack 7 is provided so as to be opposed to the fixed rack 6. The movable rack 7 is movable with respect to the fixed rack 6. The movable rack 7 can mesh with the fixed rack 6, and the mesh thereof with the fixed rack 6 can be cancelled. The movable rack 7 is driven by the air cylinder 8.

Figure 5:
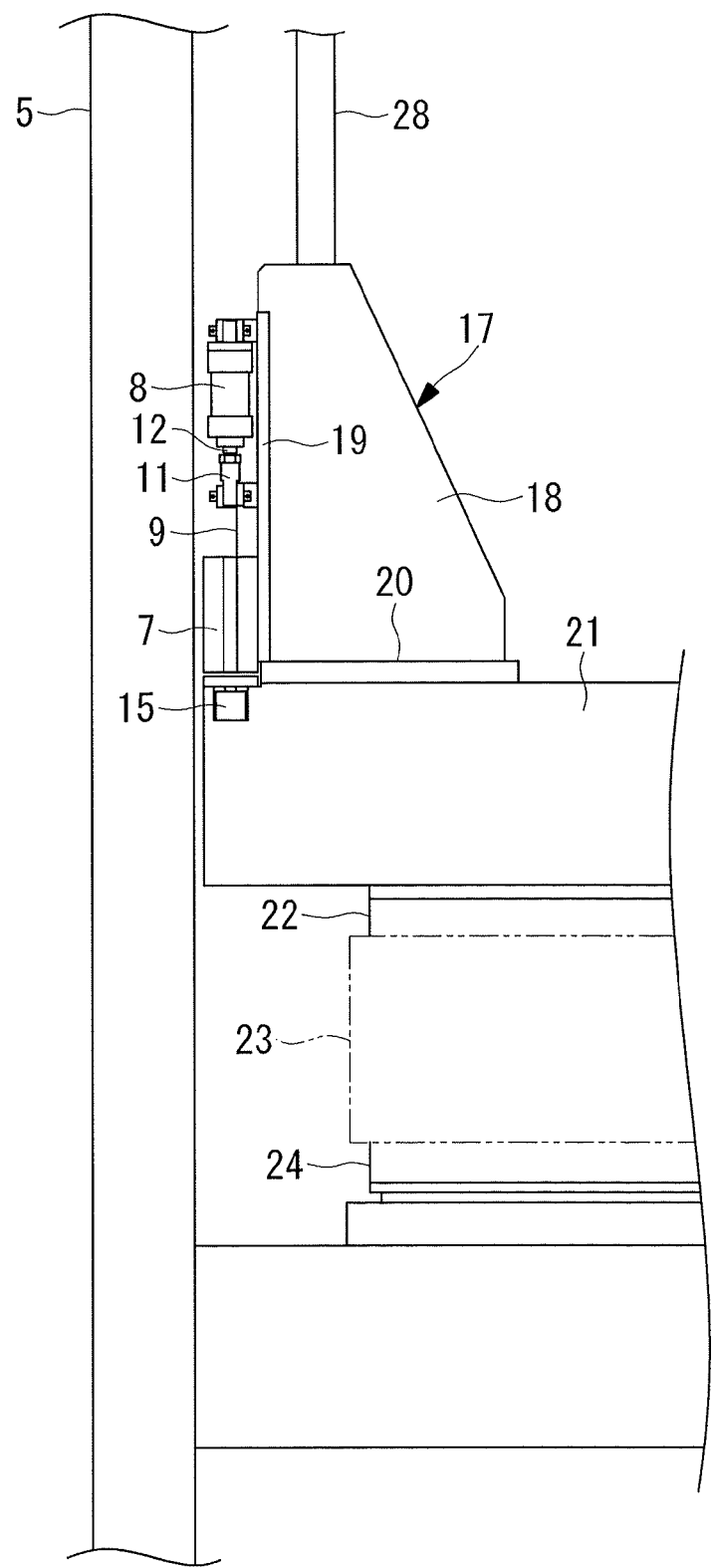
FIG. 5 is a longitudinal sectional view illustrating a pressurization holding unit of the vulcanizing apparatus according to the first embodiment of the present invention.

As illustrated in FIG. 5, the guide bracket 17 is provided above the upper mold attaching member 21. As illustrated in FIG. 2 and FIG. 5, the guide bracket 17 includes: a plate member 19 vertically provided to the upper mold attaching member 21; a plate member 20 placed on the upper surface of the upper mold attaching member 21; and a plate member 18 connected to both the plate members 19 and 20. Then, as illustrated in FIG. 5, the cylinder 8 is fixed to the plate member 19 of the guide bracket 17 by a fixing unit 13 (see FIG. 7).

Figure 7:
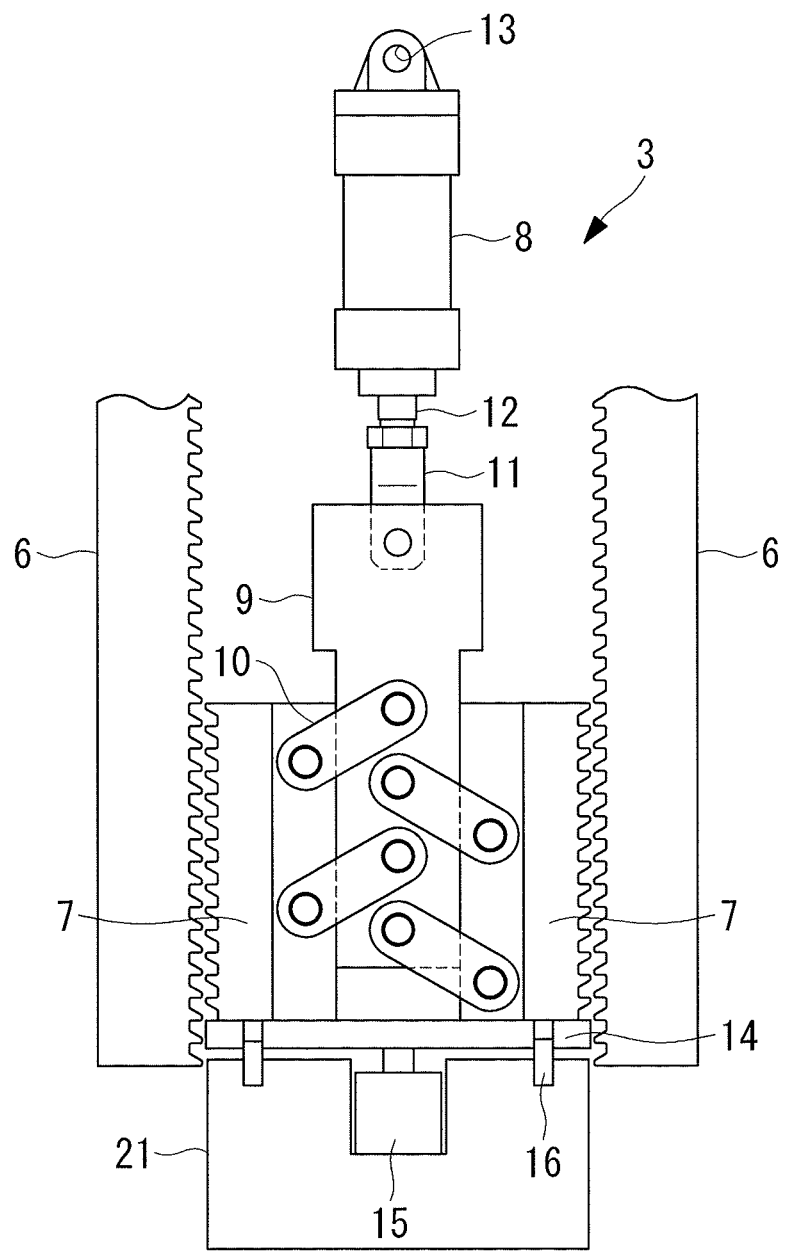
FIG. 7 is a front view illustrating the pressurization holding unit of the vulcanizing apparatus according to the first embodiment.

As illustrated in FIG. 5 and FIG. 7, the movable rack 7 is connected to the air cylinder 8 with the intermediation of links 10, a plate member 9, a coupling member 11, and a rod 12. Accordingly, the movable rack 7 is connected to the upper mold attaching member 21 with the intermediation of the guide bracket 17.

When the fixed rack 6 and the movable rack 7 mesh with each other, the upper mold attaching member 21 is fixed to the guide frame 5. Meanwhile, when the mesh between the fixed rack 6 and the movable rack 7 is cancelled, the fixation of the upper mold attaching member 21 to the guide frame 5 is cancelled, and the upper mold attaching member 21 becomes movable by driving of the hydraulic cylinder for upward/downward movement 29 in the top-bottom direction (the height direction of the mold 23).

Further, because the fixed rack 6 and the movable rack 7 each have the plurality of teeth arranged in the height direction of the mold 23, as illustrated in FIG. 3 and FIG. 4, the upper mold attaching member 21 is adjusted to an appropriate height within a range within which the fixed rack 6 and the movable rack 7 can mesh with each other. FIG. 3 and FIG. 4 each illustrate the state where the fixed rack 6 and the movable rack 7 mesh with each other. In FIG. 3, the movable rack 7 meshes with an upper portion of the fixed rack 6. In FIG. 4, the movable rack 7 meshes with a lower portion of the fixed rack 6. The state of FIG. 3 corresponds to the case where the height of the mold 23 is large, and the state of FIG. 4 corresponds to the case where the height of the mold 23 is small. In both the cases, the upper mold attaching member 21 is fixed to the guide frame 5. As a matter of course, the fixed rack 6 and the movable rack 7 can mesh with each other even at an intermediate position between the states of FIG. 3 and FIG. 4.

As described above, the pressurization holding unit 3 including the fixed rack 6 and the movable rack 7 enables the upper mold attaching member 21 to be fixed to the guide frame 5 in accordance with various heights of the mold 23. If the strengths of the fixed rack 6 and the movable rack 7 are adjusted, the fixed state can be firmly held against the pressurization reaction force during the vulcanization process.

The height adjusting member 14 is connected to the movable rack 7 on the upper mold attaching member 21 side thereof. The height adjusting member 14 is movable by driving of the air cylinder 15 in the height direction of the mold 23 together with the movable rack 7, with respect to the upper mold attaching member 21. The upper mold attaching member 21 is provided with a slider 16 that protrudes toward the height adjusting member 14, and the height adjusting member 14 is provided with a through-hole corresponding to the slider 16. The slider 16 slides inside of the through-hole, whereby the height adjusting member 14 can stably move.

After the height of the upper mold attaching member 21 is determined by the height of the mold 23, depending on the positional relation between the teeth of the fixed rack 6 and the teeth of the movable rack 7, the tooth tips of the two racks may interfere with each other, and the two racks may not mesh with each other in some cases. In contrast, according to the height adjusting member 14, the movable rack 7 is movable with respect to the upper mold attaching member 21. Hence, the movable rack 7 is moved to a position at which such interference between the tooth tips does not occur, whereby the fixed rack 6 and the movable rack 7 can be caused to completely mesh with each other. At this time, the movable rack 7 can be moved while the height of the upper mold attaching member 21 is kept constant, and hence the height of the upper mold attaching member 21 is not changed by an influence of mesh adjustment.

Next, an operation of the pressurization holding unit 3 is described with reference to FIG. 7 to FIG. 9.

FIG. 7 illustrates a state before the fixed rack 6 and the movable rack 7 mesh with each other, and the upper mold attaching member 21 is movable with respect to the guide frame 5. At this time, the rod 12 is housed in the air cylinder 8, and the coupling member 11 and the plate member 9 are located on the air cylinder 8 side. The plurality of links 10 provided to the plate member 9 are oblique to the height direction of the mold 23, and the movable rack 7 is spaced apart from the fixed rack 6.

When the position of the upper mold attaching member 21 is determined by the height of the mold 23 at the start of the vulcanization process, the movable rack 7 moves toward the fixed rack 6 so as to mesh with the fixed rack 6. In the case where the tooth tips of the fixed rack 6 and the movable rack 7 interfere with each other in the state as illustrated in FIG. 7, the air cylinder 15 is driven to adjust the height of the height adjusting member 14, while the position of the upper mold attaching member 21 is fixed. FIG. 8 illustrates a state after the height of the movable rack 7 is adjusted, and illustrates a state where the height adjusting member 14 is moved toward the upper mold attaching member 21 while the movable rack 7 is spaced apart from the fixed rack 6.

After the positional relation in which the tooth tips of the fixed rack 6 and the movable rack 7 do not mesh with each other is obtained, the movable rack 7 moves again toward the fixed rack 6 so as to mesh with the fixed rack 6. FIG. 9 illustrates a state after the fixed rack 6 and the movable rack 7 mesh with each other, and the upper mold attaching member 21 is fixed to the guide frame 5. At this time, the rod 12 comes out of the air cylinder 8, and the coupling member 11 and the plate member 9 are spaced apart from the air cylinder 8. The plurality of links 10 provided to the plate member 9 become perpendicular to the height direction of the mold 23, and the movable rack 7 meshes with the fixed rack 6.

After that, upon the start of the vulcanization process, because a pressure is applied to the inside of the mold 23, the pressurization cylinder 25 tightens up the mold 23 such that the mold 23 is not opened. At this time, a stroke of the pressurization cylinder 25 completely eliminates a gap between the movable rack 7 and the fixed rack 6 and gaps caused on the upper and lower surfaces of the height adjusting member 14. As a result, the reaction force from the mold 23 is transmitted in order of the upper mold attaching member 21→the height adjusting member 14→the movable rack 7→the fixed rack 6→the guide frame 5. Accordingly, the pressurization reaction force is sufficiently transmitted to the guide frame 5 without the intermediation of the air cylinder 8 and the air cylinder 15, so that the pressurization reaction force is held.

Figure 8:
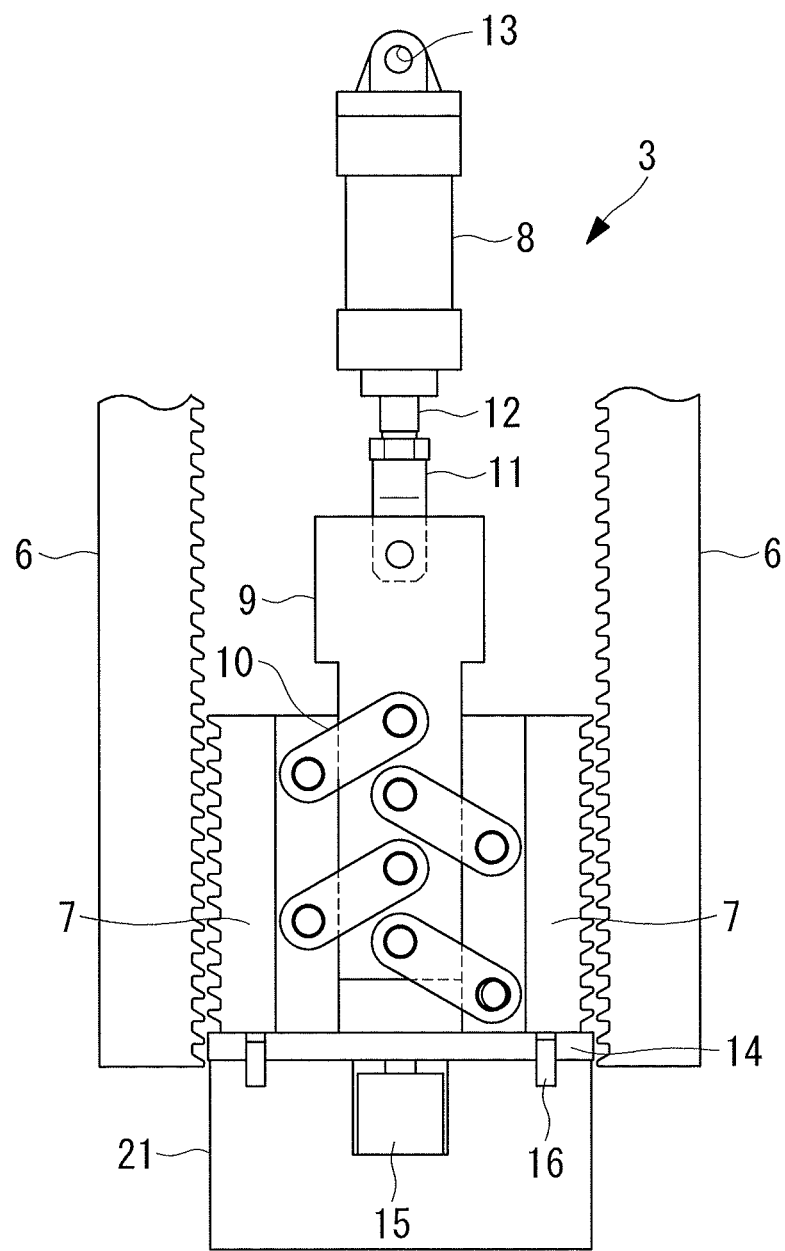
FIG. 8 is a front view illustrating the pressurization holding unit of the vulcanizing apparatus according to the first embodiment.
Figure 9:
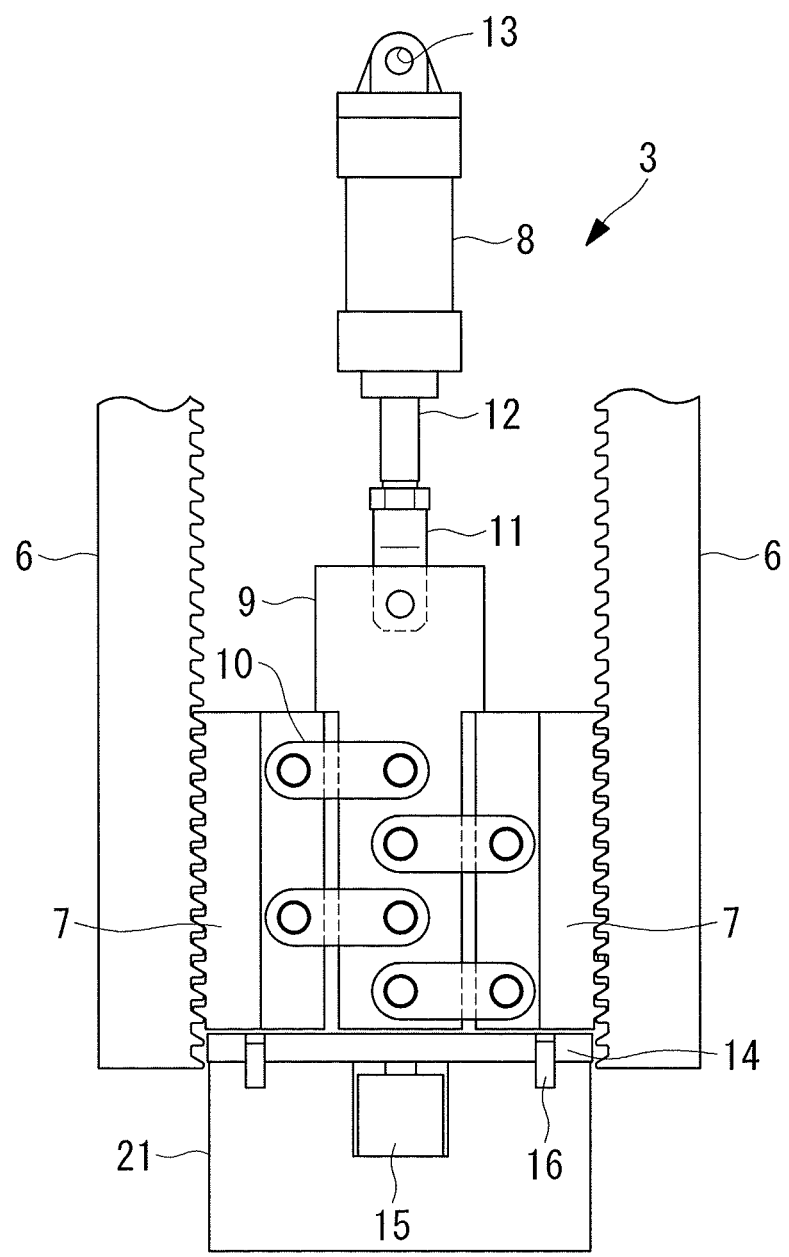
FIG. 9 is a front view illustrating the pressurization holding unit of the vulcanizing apparatus according to the first embodiment.

As illustrated in FIG. 7 to FIG. 9, the upper surfaces of the teeth of the fixed rack 6 are oblique to the height direction of the mold 23, and the lower surfaces thereof are perpendicular to the height direction of the mold 23. The lower surfaces of the teeth of the movable rack 7 are oblique to the height direction of the mold so as to respectively fit the upper surfaces of the teeth of the fixed rack 6. The oblique surfaces of the teeth of the fixed rack 6 and the oblique surfaces of the teeth of the movable rack 7 are provided so as to be opposed to each other.

Because the teeth of the fixed rack 6 and the teeth of the movable rack 7 have such a configuration as described above, even in the case where the teeth of the fixed rack 6 and the teeth of the movable rack 7 come into contact with each other while the two racks move in the direction in which the two racks mesh with each other, the fixed rack 6 and the movable rack 7 relatively move along the mutual oblique surfaces formed on the teeth thereof. The height adjusting member 14 moves upward in the height direction of the mold 23, while the position of the upper mold attaching member 21 is fixed, whereby the height of the movable rack 7 is changed. As a result, as illustrated in FIG. 9, the movable rack 7 and the fixed rack 6 completely mesh with each other.

The teeth of the fixed rack 6 and the teeth of the movable rack 7 are the same in dimensions and shape. Meanwhile, setting of gap dimensions to the pitch is considered. Specifically, the shapes of the teeth of the fixed rack 6 and the teeth of the movable rack 7 are determined such that the two racks mesh with each other in any of the following four conditions: the two racks mesh with each other without height adjustment; the two racks slide up on the mutual oblique surfaces to mesh with each other without height adjustment; the two racks mesh with each other through height adjustment; and the two racks slide up on the mutual oblique surfaces to mesh with each other through height adjustment. At this time, the tooth tips of the fixed rack 6 and the movable rack 7 are equal to or less than ¼ the tooth pitch. The range in which the tooth tips of the two racks abut against each other and the two racks cannot mesh with each other is defined to be equal to or less than ½ the pitch. As a result, in the case where the tooth tips of the two racks abut against each other, the height of the movable rack 7 is adjusted by ½ the pitch, whereby the two racks can mesh with each other without fail. The amount of height adjustment is ½ the pitch in view of the above. The pressure angle (escape side) of each tooth surface is an angle that allows the movable rack 7 to climb the oblique surfaces. This angle is defined by the friction coefficient of a pressure angle surface and force (angle) from the links 10 acting on the movable rack 7.

Next, a mesh operation of the fixed rack 6 and the movable rack 7 is described in the following four cases with reference to FIG. 12 to FIG. 20.

Figure 12:
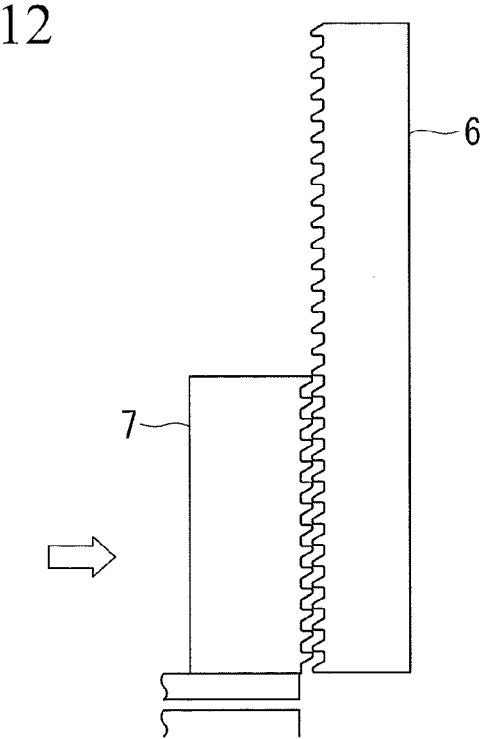
FIG. 12 is a front view illustrating a first rack and a second rack.

In the first case, after the height of the upper mold attaching member 21 is determined, as illustrated in FIG. 12, the teeth of the fixed rack 6 and the teeth of the movable rack 7 are in a positional relation in which the tooth tips of the two racks do not interfere with each other. In this case, if the movable rack 7 simply moves toward the fixed rack 6, the two racks completely mesh with each other.

Figure 13:
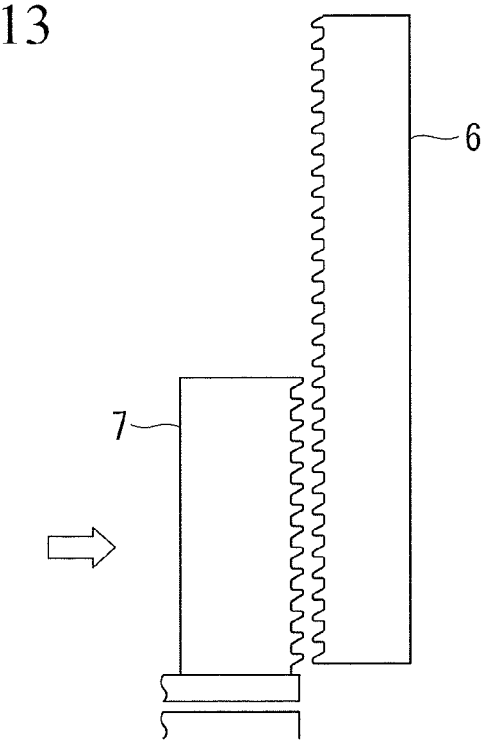
FIG. 13 is a front view illustrating the first rack and the second rack.
Figure 14:
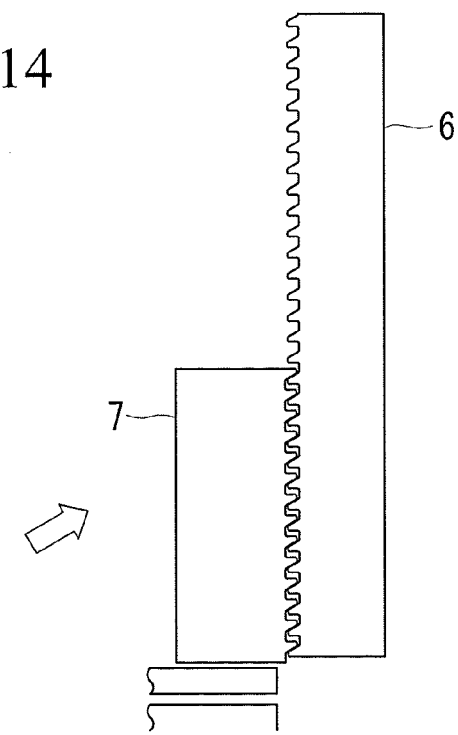
FIG. 14 is a front view illustrating the first rack and the second rack.

In the second case, after the height of the upper mold attaching member 21 is determined, as illustrated in FIG. 13, the teeth of the fixed rack 6 and the teeth of the movable rack 7 are in a positional relation in which the oblique surfaces of the teeth of the two racks come into contact with each other. In this case, as indicated by an arrow in FIG. 14, the movable rack 7 moves along the oblique surfaces, and the two racks then completely mesh with each other.

Figure 15:
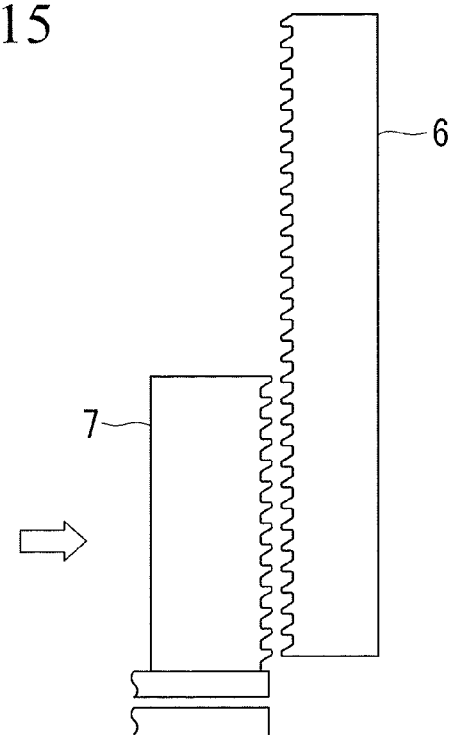
FIG. 15 is a front view illustrating the first rack and the second rack.
Figure 16:
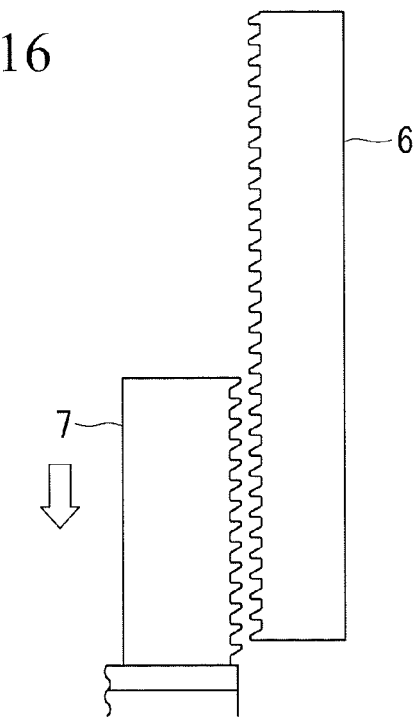
FIG. 16 is a front view illustrating the first rack and the second rack.
Figure 17:
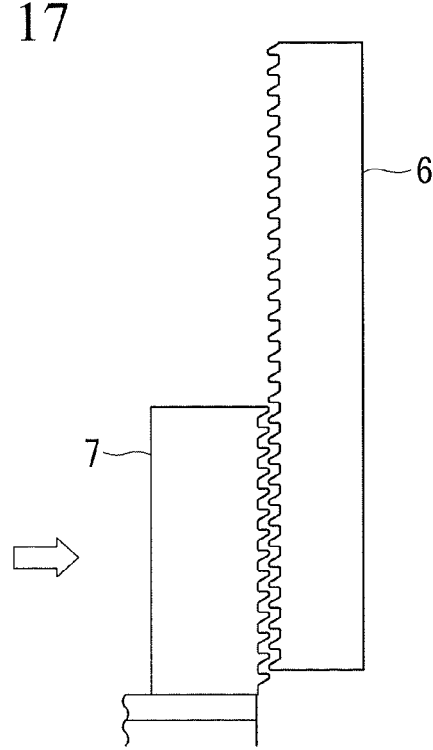
FIG. 17 is a front view illustrating the first rack and the second rack.

In the third case, after the height of the upper mold attaching member 21 is determined, as illustrated in FIG. 15, the teeth of the fixed rack 6 and the teeth of the movable rack 7 are in a positional relation in which the tip portions of the teeth of the two racks come into contact with each other. In this case, first, as illustrated in FIG. 16, the position of the movable rack 7 is moved downward by a given height. As a result, as illustrated in FIG. 17, the teeth of the fixed rack 6 and the teeth of the movable rack 7 are in a positional relation in which the tooth tips of the two racks do not interfere with each other. Hence, if the movable rack 7 simply moves toward the fixed rack 6, the two racks completely mesh with each other.

Figure 18:
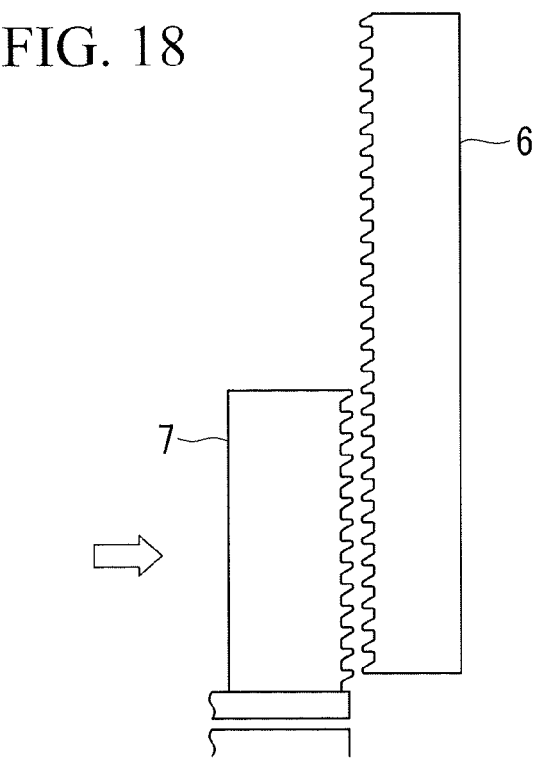
FIG. 18 is a front view illustrating the first rack and the second rack.
Figure 19:
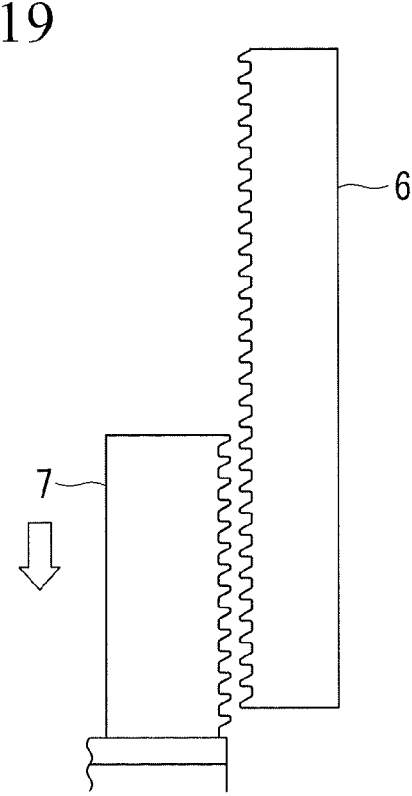
FIG. 19 is a front view illustrating the first rack and the second rack.
Figure 20:
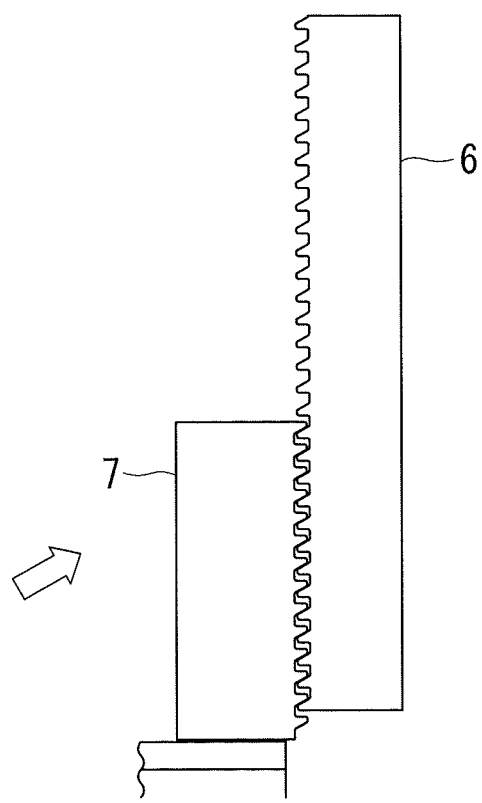
FIG. 20 is a front view illustrating the first rack and the second rack.

In the fourth case, after the height of the upper mold attaching member 21 is determined, as illustrated in FIG. 18, the teeth of the fixed rack 6 and the teeth of the movable rack 7 are in a positional relation in which the tip portions of the teeth of the two racks come into contact with each other. In this case, first, as illustrated in FIG. 19, the position of the movable rack 7 is moved downward by a given height. As a result, as illustrated in FIG. 20, the teeth of the fixed rack 6 and the teeth of the movable rack 7 are in a positional relation in which the oblique surfaces of the teeth of the two racks come into contact with each other. In this case, as indicated by an arrow in FIG. 20, the movable rack 7 moves along the oblique surfaces, and the two racks then completely mesh with each other.

In this way, owing to the combination of driving of the height adjusting member 14, the fixed rack 6, and the tooth shape of the movable rack 7, the upper mold attaching member 21 can be fixed to the guide frame 5 without a change in height of the upper mold attaching member 21, at whichever position the upper mold attaching member 21 is.

Figure 10:
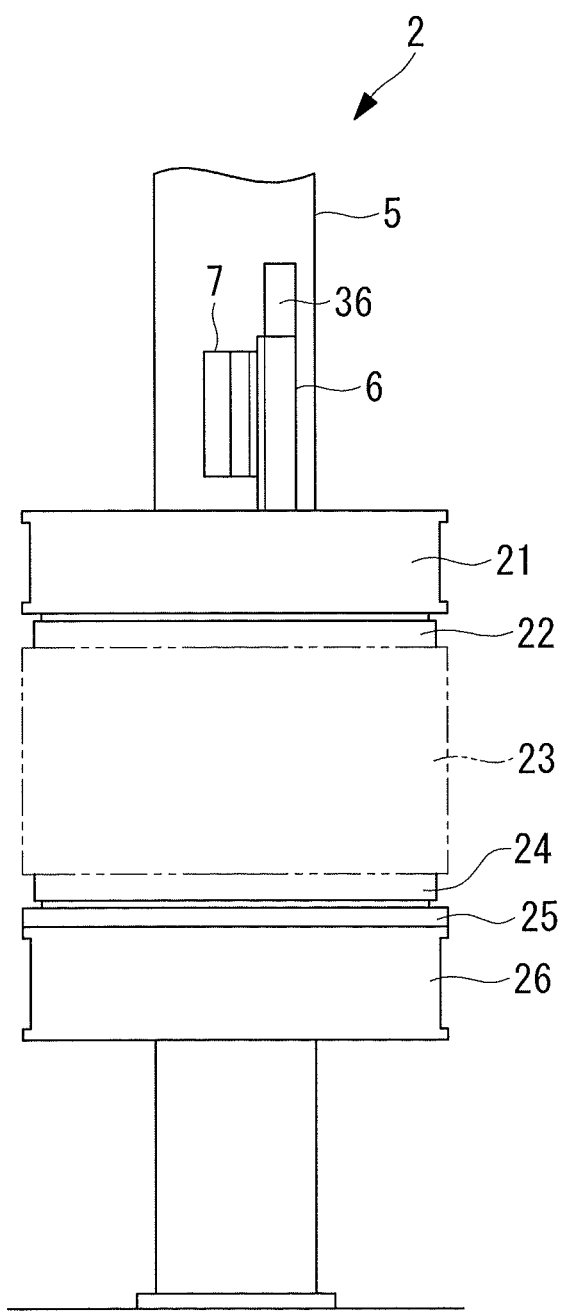
FIG. 10 is a longitudinal sectional view illustrating a vulcanizing apparatus according to a second embodiment of the present invention.
Figure 11:
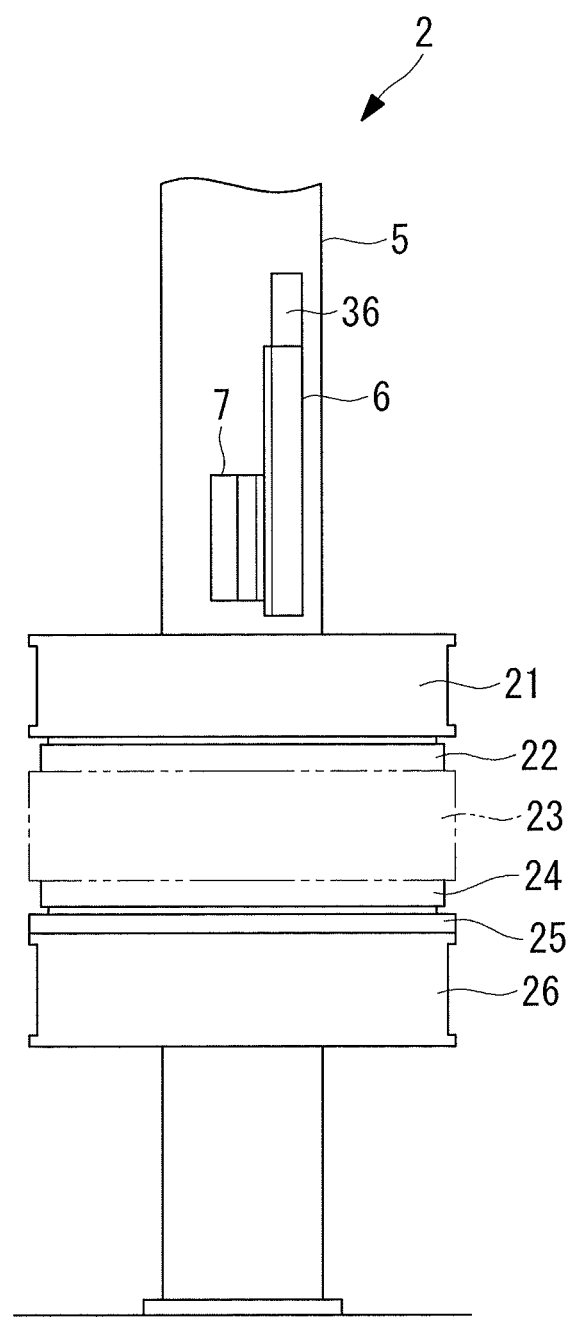
FIG. 11 is a longitudinal sectional view illustrating the vulcanizing apparatus according to the second embodiment.

A second embodiment of the present invention is described with reference to FIG. 10 and FIG. 11.

In the first embodiment, two fixed racks 6 are provided to the guide frame 5 so as to be opposed thereto, and two movable racks 7 are provided so as to respectively correspond to the two fixed racks 6. The present invention is not limited to this example. As in the tire vulcanizer 2 according to the second embodiment illustrated in FIG. 10 and FIG. 11, one fixed rack 6 may be provided to the guide frame 5, and one movable rack 7 may be provided so as to correspond to the one fixed rack 6. According to this configuration, it is possible to adjust the height of the upper mold attaching member 21 with respect to the guide frame 5 while fixing the upper mold attaching member 21 thereto, with a simpler structure.

As described above, the first and second embodiments of the present invention have a fixing function corresponding to the height of the mold 23 as well as a height adjustment function, within a range within which the fixed rack 6 and the movable rack 7 can mesh with each other.

Then, the present embodiment provides a simpler structure compared with that of a conventional tire vulcanizer including a clamping apparatus and a mold height adjusting apparatus configured independently of each other. For example, a mold height adjusting apparatus (upward/downward movement screws) is not necessary, and hence the number of components is significantly reduced in the present embodiment. Further, the design strength for resisting the pressurization reaction force applied to the mold can be adjusted by changing the lengths and widths of the fixed rack 6 and the movable rack 7, and hence a strong structure can be obtained relatively easily. Moreover, such a simpler structure as described above leads to improvement in maintenance properties of expendable components and replacement properties of components.

Note that, in the first and second embodiments, description is given of the case where the rack provided to the guide frame 5 is fixed and where the rack provided to the upper mold attaching member 21 is movable, but the present invention is not limited to this example. For example, the rack provided to the upper mold attaching member 21 may be fixed, and the rack provided to the guide frame 5 may be movable with respect to the rack provided to the upper mold attaching member 21.

Moreover, in the above embodiments, description is given of the vulcanizer 2 in which the position of the lower mold 35 is always fixed and where the upper mold 4 is movable with respect to the lower mold 35, but the present invention is not limited to this example. For example, the position of the upper mold 4 may be always fixed, and the lower mold 35 may be movable with respect to the upper mold 4. At this time, the first rack and the second rack (the fixed rack 6 and the movable rack 7) are provided so as to correspond to a movable lower mold attaching member.

Further, in the above embodiments, description is given of the case where the air cylinder 8 and a link mechanism including the plurality of links 10 and the plate member 9 are used for driving of the movable rack 7, but the present invention is not limited to this example. Other means may be used as long as the movable rack 7 can be fixed to the fixed rack 6 and can be spaced apart from the fixed rack 6.

Furthermore, in the above embodiments, description is given of the case where the teeth of the fixed rack 6 and the teeth of the movable rack 7 each have one surface oblique to the height direction of the mold 23 and another surface perpendicular to the height direction of the mold 23, but the present invention is not limited to this example. The teeth of the fixed rack 6 and the teeth of the movable rack 7 may have other shape as long as the upper mold attaching member 21 can be fixed at the time of mesh therebetween while the height of the upper mold attaching member 21 is adjusted.

REFERENCE SIGNS LIST 1 tire vulcanizing apparatus
2 tire vulcanizer
3 pressurization holding unit
4 upper mold
5 guide frame (support member)
6 fixed rack (first rack)
7 movable rack (second rack)
8 air cylinder (first driving unit)
9 plate member
10 link
11 coupling member
12 rod
13 fixing unit
14 height adjusting member
15 air cylinder (second driving unit)
16 slider
17 guide bracket
18, 19, 20 plate member
21 upper mold attaching member
22 upper platen
23 openable/closable mold
24 lower platen
25 pressurization cylinder
26 base frame (lower mold attaching member)
27 bladder
28 hydraulic cylinder rod
29 hydraulic cylinder for upward/downward movement
30 openable/closable mold operating apparatus
31 loader
32 unvulcanized tire
33 vulcanized tire
34 unloader
35 lower mold
36 rack fixing unit

The invention claimed is:
1. A tire vulcanizer comprising:
a support member that supports an upper mold attaching member and a lower mold attaching member;
a first rack that is provided to the support member along a height direction of a mold and includes a plurality of teeth, the mold including an upper mold placed in the upper mold attaching member and a lower mold placed in the lower mold attaching member;

a second rack that is provided to the upper mold attaching member or the lower mold attaching member, meshes with the first rack, and includes a plurality of teeth;

a first driving unit that relatively moves one of the first rack and the second rack with respect to the other thereof, meshes the first rack and the second rack with each other to fix the two racks to each other, and cancels the mesh between the first rack and the second rack; and a second driving unit that moves the second rack in the height direction of the mold with respect to the upper mold attaching member or the lower mold attaching member while keeping a height of the upper mold attaching member or the lower mold attaching member constant.

2. The tire vulcanizer according to claim 1, wherein
when the first rack and the second rack mesh with each other, the first driving unit and the second driving unit are not driven, and force is transmitted to between the support member and the upper mold attaching member or the lower mold attaching member to which the second rack is provided, with an intermediation of the first rack and the second rack.

3. The tire vulcanizer according to claim 1, further comprising a link mechanism that couples the first driving unit to the first rack or the second rack that is relatively moved by the first driving unit.

4. The tire vulcanizer according to claim 1, wherein
the teeth of the first rack and the teeth of the second rack have surfaces oblique to the height direction of the mold,
the oblique surfaces of the teeth of the first rack and the oblique surfaces of the teeth of the second rack are provided so as to be opposed to each other, and
when the teeth of the first rack and the teeth of the second rack come into contact with each other, the first rack and the second rack are relatively movable along the mutual oblique surfaces.

* * * * *